United States Patent
Tarkiainen et al.

(10) Patent No.: US 6,188,882 B1
(45) Date of Patent: Feb. 13, 2001

(54) ALLOCATING EMERGENCY SPEECH ITEMS IN A MOBILE COMMUNICATION SYSTEM

(75) Inventors: Janne Tarkiainen, Espoo; Tapio Paavonen, Saarijärvi; Reino Talarmo, Riihimäki, all of (FI)

(73) Assignee: Nokia Telecommunications Oy, Espoo (FI)

( * ) Notice: Under 35 U.S.C. 154(b), the term of this patent shall be extended for 0 days.

(21) Appl. No.: 08/945,746
(22) PCT Filed: Feb. 28, 1997
(86) PCT No.: PCT/FI97/00133
    § 371 Date: Nov. 3, 1997
    § 102(e) Date: Nov. 3, 1997
(87) PCT Pub. No.: WO97/32443
    PCT Pub. Date: Sep. 4, 1997

(30) Foreign Application Priority Data

Mar. 1, 1996 (FI) .................................................. 960986

(51) Int. Cl.$^7$ .................................................. H04B 1/00
(52) U.S. Cl. .......................................... 455/404; 455/58.1
(58) Field of Search ................... 455/404, 527, 455/518, 519, 34.1, 58.1, 54.1, 54.2, 58.2, 33.1

(56) References Cited

U.S. PATENT DOCUMENTS

| | | | |
|---|---|---|---|
| 5,195,126 | 3/1993 | Carrier et al. | 379/45 |
| 5,371,900 | * 12/1994 | Bar-On et al. | 455/53.1 |
| 5,448,618 | 9/1995 | Sandleman | 379/41 |
| 5,465,391 | * 11/1995 | Hannu | 455/33.4 |
| 5,471,646 | * 11/1995 | Schultz | 455/54.1 |
| 5,530,916 | * 6/1996 | Schultz | 455/54.1 |
| 5,634,197 | * 5/1997 | Paavonen | 455/58.1 |

FOREIGN PATENT DOCUMENTS

| | | |
|---|---|---|
| 307 962 | 3/1987 | (EP) . |
| 304 955 | 3/1989 | (EP) . |
| 94/28687 | 12/1994 | (WO) . |
| 97/18540 | 5/1997 | (WO) . |

OTHER PUBLICATIONS

I–ETS (Interim European Telecommunications Standard) 300 392–10–3, Radio Equipment and Systems (RES); Trans–European Trunked Radio (TETRA); Voice plus Data (V+D) Part 10: Supplementary services stage 1 Part 10–3 Talking party identification, Sep. 1994, pp. 3–16.

Final Draft prETS 300 392–2 Nov. 1995, pp. 141–194.

MPT 1343, Performance Specification: System Interface Specification for radio units to be used with commercial trunked networks operating in Band III sub–bands 1 and 2, Jan. 1988, Chapters 1–14 with Appendices A and B, and Annex, pp. iii–AN2–1.

MPT 1327, A Signalling Standard for Trunked private Land Mobile Radio systems, Jan. 1988, Chapters 1–17 with Appendices 1–7.

* cited by examiner

Primary Examiner—Daniel S. Hunter
Assistant Examiner—Pablo N. Tran
(74) Attorney, Agent, or Firm—Pillsbury Madison & Sutro (57) ABSTRACT

A method for allocating emergency speech items in a mobile communication system comprising a network infrastructure (BS), a first subscriber station (MS1) connected to it, and at least one other subscriber station (MS2, MS3), the method comprising maintaining a group call consisting of speech items between the first subscriber station (MS1) and at least one other subscriber station (MS2), transmitting an emergency speech item demand (101) from the first subscriber station (MS1), which is in an emergency, to the network infrastructure (BS), and transmitting an emergency speech item grant message (102) from the network infrastructure to the first subscriber station. The method further comprises transmitting, to the at least one other subscriber station (MS2, MS3), emergency speech item information (103) containing the identifier of the first subscriber station (MS1) and indicating that an emergency speech item has been allocated (102) to the first subscriber station. In response to the emergency speech item information (103), the user of the at least one other subscriber station (MS2, MS3) is informed that an emergency speech item has been allocated (102) to the first subscriber station.

30 Claims, 5 Drawing Sheets

ALLOCATING EMERGENCY SPEECH ITEMS IN A MOBILE COMMUNICATION SYSTEM

FIELD OF THE INVENTION

The invention relates to a method for allocating emergency speech items in a mobile communication system comprising a network infrastructure, a first subscriber station connected to it, and at least one other subscriber station, said method comprising the following steps: maintaining a group call consisting of speech items between the first subscriber station and at least one other subscriber station, transmitting an emergency speech item demand from the first subscriber station, which is in an emergency, to the network infrastructure, transmitting an emergency speech item grant message from the network infrastructure to the first subscriber station.

BACKGROUND OF THE INVENTION

The method of the invention is intended for use particularly in PMR (Private Mobile Radio) networks, or trunking networks, which are typically company networks or public safety and security networks, in which all the channels are allocated to one or more companies or authority organizations. In addition to subscriber numbers, the subscribers in these networks have been assigned group numbers indicating to which group call group or subscriber group the subscriber belongs; thus it is possible to switch calls directed to the members of a certain group to all the subscribers of this group.

A group call is one of the key functions in a PMR network. A group call is used in various activities in which several people participate, particularly when a whole group must continuously be aware of the progress of events. A group call is a call, in which all participants can in turn talk and listen to each other. In group calls the whole group is called by one radio identity code. It is known that many radio telephone systems, particularly systems used by companies and authorities, apply group calls. As regards the radio path, a group call is typically implemented in simplex form as a point-to-multipoint call, in which speech is transmitted from one talking party to many talking parties, and a speech item is allocated to the following talking party according to a predetermined practice.

A call or a group call refers to complete exchange of information between two or more parties. A call may consist of one or more speech items. In a semi-duplex call, these speech items are sequential. A speech item refers generally to all functions relating to complete unidirectional transmission of information during a call.

The invention is applicable in mobile communication systems with either digital or analog radio paths. Analog mobile communication systems are disclosed, for example, in MPT 1327, *A Signalling Standard for Trunked Private Land Mobile Radio Systems*, January 1988, revised and reprinted November 1991, and MPT 1343, *Performance Specification*, January 1988, revised and reprinted September 1991, both issued by the Radio-communications Agency, published by the British Department of Trade and Industry. An example of digital radio telephone or mobile communication systems is the TETRA system (TETRA=Trans-European Trunked Radio). Its implementation is disclosed in the standard prETS 300 392-2, November 1995, *Radio Equipment and Systems (RES); (TETRA); Voice plus Data (V+D) Part 2: Air interface*, ETSI, 579 pages. In this system, the allocation of speech items is controlled by a switching and management infrastructure (SwMI) through base stations connected to it. When the operation of a switching and management infrastructure and base stations is referred to, only the term 'base station' will usually be employed hereafter for reasons of simplicity. The allocation of speech items in point-to-multipoint operation is thus controlled by a base station, which typically grants speech items on the basis of the requests made by mobile stations (MS). In this arrangement, a mobile station cannot transmit speech without a permission given by the base station.

Particularly in security services, a user of a mobile station may get into an emergency or some other situation requiring urgent communication or priority connections. To this end, the user of a mobile station may, when requesting a speech item, define the importance or urgency of the speech item in a speech item demand message, for instance by means of a four-step scale. The highest two values of the scale are defined as pre-emptive, i.e. the base station may force a mobile station transmitting at that moment to stop the transmission and allocate a speech item to the mobile station that requested a more urgent speech item.

The TETRA standard further defines talking party identification (SS-TPI), by means of which the identifier of the talking party, e.g. the subscriber number or a short character sequence, is shown to the other participants in a group call in order to identify the talking party or the talking party's function. This supplementary service is described in the standard prETS 300 392-10-3, September 1994, *Radio Equipment and Systems (RES); (TETRA); Voice plus Data (V+D) Part 10: Supplementary services stage 1 Part 10-3 Talking Party Identification*, ETSI, 16 pages. The corresponding operation may be implemented as only a part of the complete talking party identification supplementary service: the basic operation of the service, i.e. indicating the identifier, can be used without a subscription agreement or without identifier contents defined directly by the user.

Furthermore, the TETRA standard prETS 300 392-2, November 1995, *Radio Equipment and Systems (RES); (TETRA); Voice plus Data (V+D) Part 2: Air interface*, ETSI, particularly item 14.7.2.7, U-STATUS, defines a status message service, by means of which a mobile station can send one of predetermined status messages to the other participants in a group call, for example. At present, the standard defines one type of status information, "emergency", in addition to which the user or the network operator may define other types of status information.

In the case of an emergency group call, it may be difficult for other subscribers to distinguish between the speech items of subscribers in an emergency and those of the other subscribers. The subscriber who started the call cannot always be unambiguously considered to be in an emergency; it is also possible that several participants in the call are in an emergency or that the call has been started by another subscriber, whereby the emergency call begins only when the subscriber/subscriber station in the emergency requests an emergency speech item.

BRIEF DESCRIPTION OF THE INVENTION

It is an object of the present invention to provide a method and a system which allow participants in a group call to receive information on the fact that a participant in the group call is in an emergency and that the participant is using his emergency connection, i.e. the priority connection, for his emergency speech item. A further object of the invention is to indicate the identifier of the subscriber using the emergency speech item to other participants in the group call than the one using an emergency speech item.

An object of the invention is to provide a method and a system for indicating, in a group call of a mobile telephone system, a subscriber who is in an emergency and using his emergency speech item to the other subscriber stations and/or their users participating in the group call in question.

This new way of allocating emergency speech items is achieved with the method of the invention, which is characterized by further comprising the following steps: transmitting, to said at least one other subscriber station, emergency speech item information containing the identifier of the first subscriber station and indicating that an emergency speech item has been allocated to the first subscriber station, in response to said emergency speech item information, informing the user of said at least one other subscriber station that said emergency speech item has been allocated to the first subscriber station.

The invention further relates to a mobile communication system comprising a network infrastructure, and a first and at least one other subscriber station which are connected to the network infrastructure and which are capable of communicating in a group call divided into speech items.

The mobile communication system of the invention is characterized in that the network infrastructure further comprises means responsive to an emergency speech item demand sent by the first subscriber station for transmitting, to at least one other subscriber station, emergency speech item information containing the identifier of the first subscriber station and indicating that an emergency speech item has been allocated to the first subscriber station.

In addition, the invention relates to a subscriber station of a mobile communication system, comprising a transceiver for participating in a call divided into speech items, a control unit for controlling the operation of the subscriber station, a user interface for indicating information to the user of the subscriber station.

The subscriber station of the invention is characterized in that it further comprises indication means responsive to the emergency speech item information which is received by the subscriber station and which informs that another subscriber station has been allocated an emergency speech item for indicating this situation to the user of said subscriber station.

The subscriber station of the invention is further characterized in that it further comprises indication means responsive to the emergency notification message which is received by the subscriber and which informs that another subscriber station participating in the call has requested an emergency speech item for indicating, to the user of said subscriber station, that another subscriber station participating in the call has requested an emergency speech item.

The invention is based on the idea that in an emergency group call the message which informs of a speech item allocated to a first subscriber station and which is sent to another subscriber station participating in the call is supplemented with the information that the first subscriber station, which has been allocated the speech item, is in an emergency and participating in a priority connection, e.g. an emergency call. A subscriber is considered to be in an emergency, if his emergency is indicated to the system: e.g. if the first subscriber station has sent an emergency speech item demand or if it has requested an emergency call.

When it is indicated to participants in a call that a certain subscriber is in an emergency, the other subscribers participating in the group call may, in addition to the identifier of the subscriber station in question, also be given other information on the subscriber who is in the emergency and participating in the emergency call. The other subscribers/ users may be informed, for example, of the quality of the emergency in which the subscriber is, or of the location of the subscriber station in the emergency.

An advantage of the method of the invention is that, in an emergency call of a mobile telephone system, it allows the other subscribers of the group call to be informed, during the speech item of a subscriber in an emergency, of the subscriber or subscriber station in the emergency; the information may be, for example, the identifier, subscriber number, or even the name or other identifier of the subscriber/ subscriber station in the emergency. On the basis of the indication, the subscriber in the emergency can be distinguished from the other subscribers participating in the call and identified.

A further advantage of the invention is that it allows the system to indicate subscribers/subscriber stations in an emergency to the subscribers of a group call almost in real time. If a subscriber in an emergency were indicated by using merely information on the subscriber who started the call, the information sent to the subscribers could not be changed during the call. In this case, it would perhaps not be noticed if the subscriber in an emergency and participating in an emergency call were another subscriber than the one who originally started the group call. This would be a significant defect and problem in PMR systems, in which a (group) call divided into speech items can be very long—it may last for hours, for example. The method of the invention solves these problems by allowing the participants in a group call to be informed, specifically for each emergency speech item during that call, of which subscriber station has requested and been granted an emergency speech item.

Yet another advantage of the invention is that it solves the problem associated with the prior art that the subscriber who has started an emergency call is always considered to be the one in an emergency, and it is not possible to indicate more than one subscribers in an emergency during the same call. The method of the invention allows emergency speech items to be allocated during the call to subscriber stations that are participating in the group call and that are in an emergency. It also allows the subscriber station to inform of an emergency and the end of the emergency during the call. Immediately when an emergency speech item has been allocated to a subscriber, information on this subscriber is transmitted to the other participants in the call. The present invention thus allows the beginning and end of an emergency of a subscriber station to be indicated during a group call.

It is also an advantage of the invention that although in a radio system it is naturally also possible to orally inform participants in a call about the participants in an emergency, this means that even the subscriber in the emergency receives this information, which is not always desired. In the case of hijack, for example, it is desired that the hijacker does not hear/detect that a subscriber taken as hostage has made an emergency call. The present invention solves this problem by indicating the information on the participant in the emergency call for instance in text form on the displays of the user interfaces of subscriber stations participating in the group call. However, this information is not shown on the display of the subscriber station that requested the emergency speech item.

Yet another advantage of the invention is that once they have received information on a speech item granted to a subscriber in an emergency, the subscriber stations participating in the call may inform the users of this, whereby the users can better distinguish the speech of the subscriber in the emergency from the rest of the speech.

A further advantage of the invention is that, when a speech item is granted to a subscriber in an emergency, it allows even other information to be transmitted, such as the subscriber's identifier in text form and the subscriber's location data. The location data may be retrieved, for example, from the location data of the subscriber database of the network infrastructure, for instance with an accuracy of a location area (LA).

BRIEF DESCRIPTION OF THE DRAWINGS

In the following, the invention will be described in greater detail with reference to the accompanying drawings, in which.

DETAILED DESCRIPTION OF THE INVENTION

Figure 1:
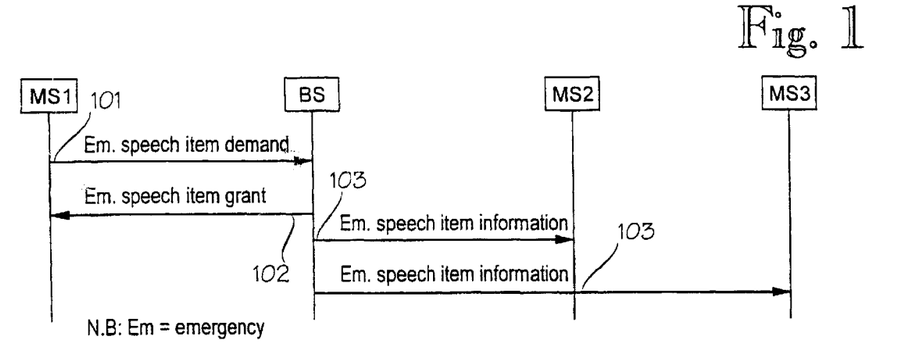
FIG. 1 is a signalling diagram illustrating the requesting of an emergency speech item and the indicating of emergency speech item information to the user of a subscriber station.

FIG. 1 is a signalling diagram illustrating the requesting of an emergency item and the indicating of emergency speech item information to the user of a subscriber station. The method starts in a situation where a call has already been set up between subscribers MS1, MS2 and MS3. FIG. 1 shows subscriber stations MS1–MS3 and a base station BS representing the network infrastructure. In the method, the first subscriber station MS1 transmits 101 an emergency speech item demand to the network infrastructure BS. The BS processes the demand and transmits 102 a message on the grant of an emergency speech item to the MS1. According to the invention, emergency speech item information is simultaneously transmitted 103 to the other subscriber stations MS2, MS3 participating in the call. This information contains the identifier of the first subscriber station and indicates that an emergency speech item has been allocated to the first subscriber station, which means that the first subscriber station is in an emergency.

Figure 2:
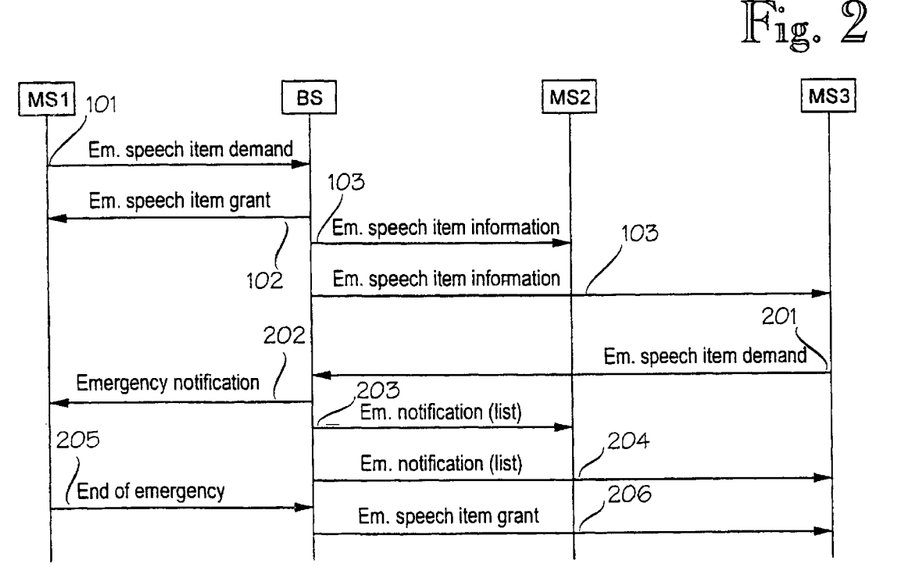
FIG. 2 is a signalling diagram illustrating the requesting of an emergency speech item and the indicating of emergency speech item information to the user of a subscriber station in a situation where another subscriber station also requests an emergency speech item.

FIG. 2 is a signalling diagram illustrating the requesting of an emergency speech item and the indicating of emergency speech item information to the user of a subscriber station in a situation where a third subscriber station MS3 requests an emergency speech item while the emergency speech item of the first subscriber station is still in progress. FIG. 2 shows the same participants as FIG. 1. Steps 101, 102 and 103 of this method are the same as the corresponding steps of FIG. 1. The method starts in a situation where a group call has already been set up. After this, the method of the invention differs from the method illustrated in FIG. 1 in that a third subscriber station MS3 requests 201 an emergency speech item while the emergency speech item of the first subscriber station MS1 is still ongoing. In this case, the network infrastructure indicates the emergency speech item demand 201 of MS3 to MS1, which has an ongoing emergency speech item, by transmitting 202 an emergency notification message to MS1. As a result of this emergency notification, MS1 knows that another subscriber station (in this case MS3) is in an emergency, and an emergency speech item will be allocated to this subscriber station. The first subscriber station can then stop its emergency speech item and transmit 205 a speech item end message to that effect to the network infrastructure. In this message, the subscriber station can preferably indicate that the emergency in which it is involved still continues even though it temporarily gives up its emergency speech item. On the other hand, the subscriber station may also indicate that its emergency has ended. Before this, the network infrastructure may send 203, 204, to MS1, MS3 and the other participants in the call, emergency speech item information or a list which informs that the first and the third subscriber stations are in an emergency and have requested an emergency speech item. After step 205, when the network infrastructure has been informed that the first mobile station has ended its emergency speech item, it sends 206 an emergency speech item grant message to the third subscriber station, which is allocated an emergency speech item and then starts it. Thereafter emergency speech item information is further transmitted to the subscriber stations participating in the group call, in accordance with the invention.

Figure 3:
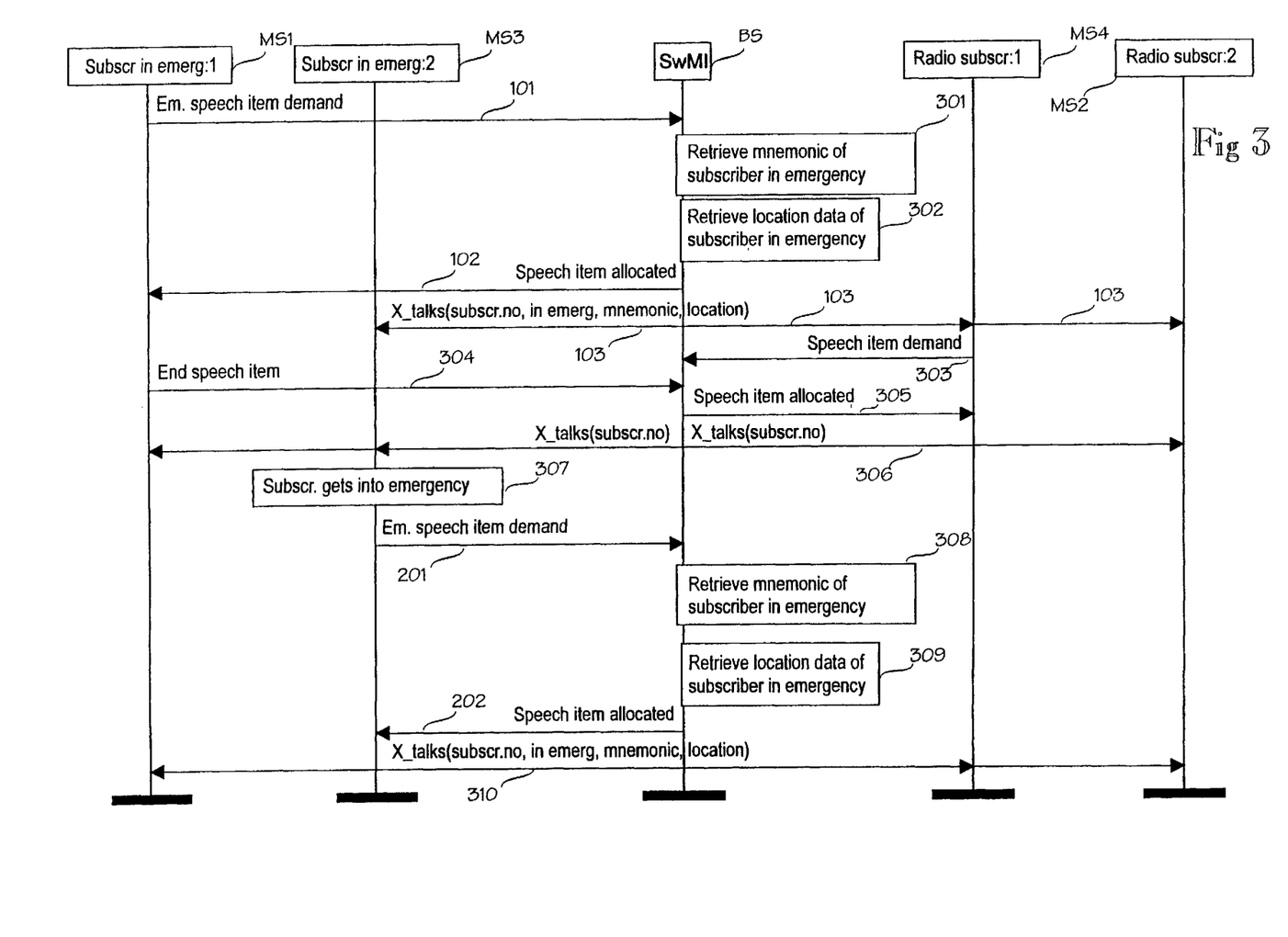
FIG. 3 is a signalling and functional diagram of the requesting of an emergency speech item and the indicating of emergency speech item information to the user of a subscriber station in a situation where a subscriber station requests an emergency speech item at the same time that another subscriber station is using its own conventional speech item.

FIG. 3 is a signalling and functional diagram of the requesting of an emergency speech item and the indicating of emergency speech item information to the user of a subscriber station in a situation where a third subscriber station MS3 requests an emergency speech item at the same time that another subscriber station MS4 is using its own conventional speech item. FIG. 3 illustrates the same participants in the call as FIG. 1. In this figure, steps 101, 102 and 103 are the same as the corresponding steps of FIG. 1, and steps 201, 202 and 205 are the same as the corresponding steps of FIG. 2. FIG. 3 illustrates how a system to which the invention is applied operates in an emergency group call. Both subscribers in an emergency and other subscribers can request speech items. The method starts in a situation where a group call has already been set up, and a mobile station MS1 in an emergency demands 101 an emergency speech item. In response to this demand, the network infrastructure retrieves 301 the text identifier (mnemonic) and location data 302 of the subscriber station/subscriber in the emergency. At the same time that the other subscribers of the call are informed 103 of the speech item, they are informed of the subscriber in the emergency: e.g. by the subscriber's identifier, information on the emergency and its quality, the mnemonic and location of the subscriber. Thereafter a normal, fourth subscriber station MS4, which is not in an emergency, requests a speech item. This is allocated 305 to MS4 as soon as the subscriber station MS1 in the emergency has informed 304 that it has ended its emergency speech item. The other subscribers are normally informed 306 that the speech item has changed by giving the identifier, or subscriber number, of the talking party.

During the normal speech item of MS4, an emergency arises 307 with the third subscriber station/subscriber, whereby it sends 201 an emergency speech item demand to the system. On the basis of the demand, it is detected that the subscriber is in an emergency, and the necessary data concerning the subscriber station/subscriber are searched for/retrieved 308, 309 in the same way as in steps 301 and 302 above. This information is sent 310 to the other participants in the call with the speech item grant message. The subscriber in the emergency is normally informed 202 that a speech item has been allocated to it pre-emptively.

Figure 4:
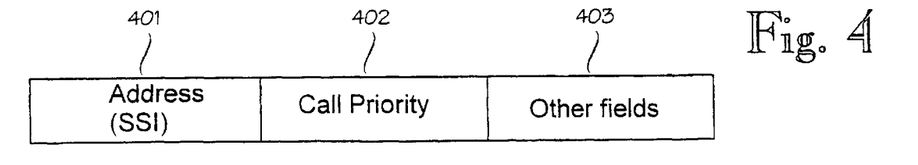
FIG. 4 shows the structure of an emergency speech item demand transmitted by a subscriber station.

FIG. 4 shows the structure of an emergency speech item demand transmitted by a subscriber station. With this message, the subscriber station thus requests an emergency speech item. Field 401 comprises the address of the first subscriber station in use (SSI=Short Subscriber Identity). Field 402 contains the call priority, i.e. information on the fact that a priority or emergency speech item demand is in question. An emergency speech item demand may also comprise other fields 403.

Figure 5:
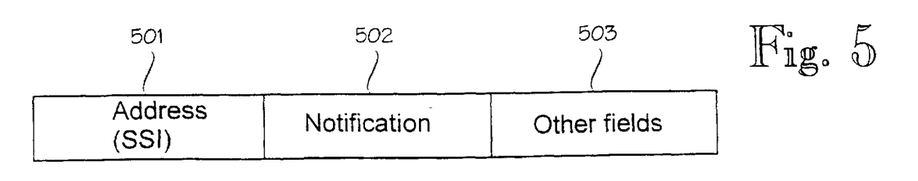
FIG. 5 shows the structure of a message transmitted by the network infrastructure and containing speech item information.

FIG. 5 shows the structure of a message transmitted by the network infrastructure and containing speech item information. With this message, according to the invention, the network infrastructure transmits emergency speech item information to one or more other subscribers to inform them that an emergency speech item has been allocated to the first subscriber station. Field 501 of the message contains the identifier of the first subscriber station, which is in an emergency, e.g. the address (SSI), and information on the fact that the message informs of an emergency speech item, i.e. it is an emergency notification 502. The message may also contain other fields, e.g. a group identifier and/or information on the location of the first subscriber station.

Figure 6:
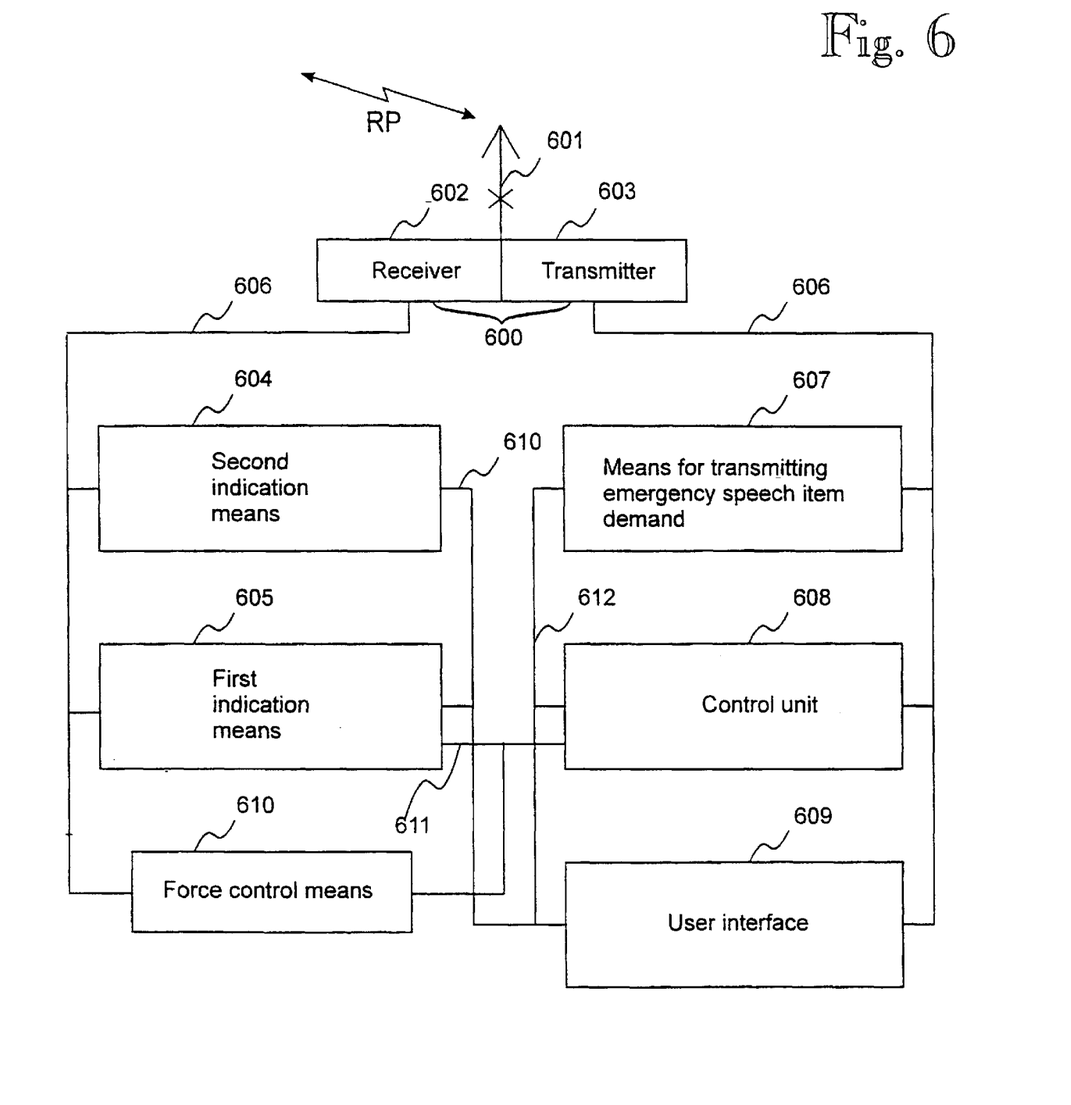
FIG. 6 is a block diagram of a subscriber station of the invention.

FIG. 6 is a block diagram of a subscriber station of the invention. The subscriber station may be, for example, a radio telephone, mobile station or line station connected to the network infrastructure by radio link or wired connections. A network infrastructure comprises, for example, base stations BS, switching centres, and other telecommunication equipments. The figure illustrates a typical subscriber station communicating in a mobile communication system. The transceiver (TX/RX) 600 has to tune to the currently used radio channel by means of which the mobile station communicates with the network infrastructure. The transceiver may consist of a receiver 602 and a transmitter 603. The transceiver 600 is connected to an antenna 601, which is connected to the radio path RP. Radio frequencies in the range of 60 to 1000 MHz (VHF and UHF) are usually employed, although it is also possible to use other frequencies. It is possible to use either analog or digital modulation on the radio path RP. In the case of a line station, the transceiver 600 is replaced by line interface units, by which the line station is connected to the radio link or wired connection that is used.

A user interface 609 comprises electroacoustic converter means, typically an earpiece and a microphone, and optionally buttons for starting and ending a call and for dialling. Mobile stations used in trunking systems may also comprise a speech button, which has to be pressed during a speech item (e.g. a PTT switch).

A control unit 608 controls the operation of the radio unit. The control unit 608 is connected to the user interface 209, from which it receives impulses relating to starting or ending of a call, for example. Through the user interface 609, the control unit 608 may also give audio or visual signals relating to the operation of the radio telephone and/or radio telephone system, for example to inform that an emergency speech item has been allocated to another subscriber station, or that another subscriber station is requesting an emergency item.

The control unit 608 is connected to the transceiver TX/RX 600. The channel used by the transceiver is allocated by the control unit 608; in other words, the transceiver 600 tunes to the channel, or radio frequency, allocated by the control unit 608 and to a suitable time slot. The control unit 608 also controls the switching on of the transceiver 600. The control unit 608 receives and transmits signalling messages through the transceiver 600. A mobile station, or subscriber station, of the invention can be used, for example, in a radio system comprising a radio network, or network infrastructure, with at least one base station and a plurality of subscriber stations.

The subscriber station of the invention further comprises means 607 for transmitting an emergency speech item demand. When the user of the subscriber station is in an emergency, an emergency speech item demand is sent from the subscriber station to the network infrastructure. The control unit 608 and transceiver 600 of the subscriber station are connected to all the other units of the subscriber station, e.g. by buses 606.

The subscriber station of the invention may be, for example, a subscriber station provided with an equipment identity and comprising a transceiver 600 for participation in a call divided into speech items, a control unit 608, and a user interface 609. The subscriber station may also comprise an individual subscriber identification module, which is detachably connected to the subscriber station, whereby a mobile station is formed. The subscriber identification module is, for instance, a SIM card.

The subscriber station of the invention further comprises first indication means 605 responsive to the emergency speech item information which is received by the base station and which indicates that an emergency speech item has been allocated to another subscriber station for indicating this situation to the user of the subscriber station, for example by means of the user interface 609.

The subscriber station of the invention further comprises second indication means 604 responsive to the emergency notification which informs that another subscriber station participating in the call has requested an emergency speech item and which is received by the base station. The second indication means 604 indicate this to the user of the subscriber station, for example through the user interface 609.

The subscriber station of the invention may further comprise force control means 610 responsive to an emergency notification message received by the subscriber station for force controlling the subscriber station to end its emergency speech item.

Figure 7:
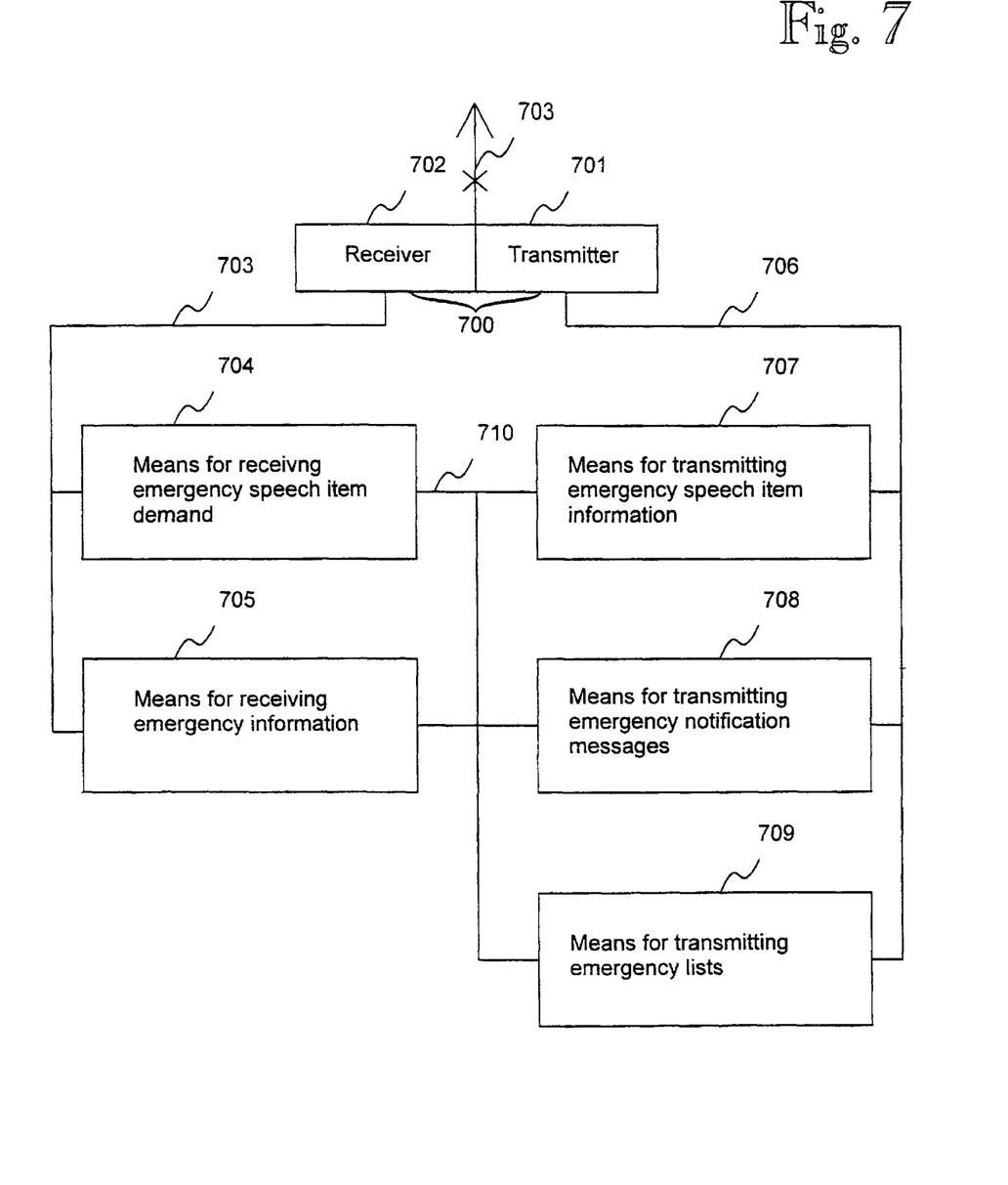
FIG. 7 is a block diagram of a network infrastructure of the invention.

FIG. 7 is a block diagram of a network infrastructure of the invention. FIG. 7 shows the network infrastructure of a mobile communication system, comprising for instance a base station BS, or other means for setting up a telecommunication connection, and switching centres. The figure shows a transceiver 700 of the network infrastructure, e.g. a base station. The transceiver may consist of a receiver 702 and a transmitter 701, and it is connected to an antenna 703.

The network infrastructure of the invention further comprises means 707 responsive to an emergency speech item demand sent by the first subscriber station for transmitting, to at least one other subscriber station MS2, MS3, emergency speech item information comprising the identifier of the first subscriber station MS1 and indicating that an emergency speech item has been allocated to the first subscriber station.

The network infrastructure of the invention further comprises means 708 responsive to an emergency speech item demand sent by a third subscriber station for transmitting an emergency notification message indicating that the third subscriber station MS3 has requested an emergency speech item to subscriber stations MS1, MS2 participating in the group call.

The network infrastructure of the invention further comprises means 709 for transmitting an emergency list containing the identifiers of the subscriber stations that are in an emergency at that moment to the subscriber stations MS1, MS2, MS3.

The network infrastructure of the invention further comprises means 704 for receiving emergency speech item demands transmitted by subscriber stations and for allocating emergency speech items.

The network infrastructure of the invention further comprises means 705 for receiving emergency information.

Figure 8:
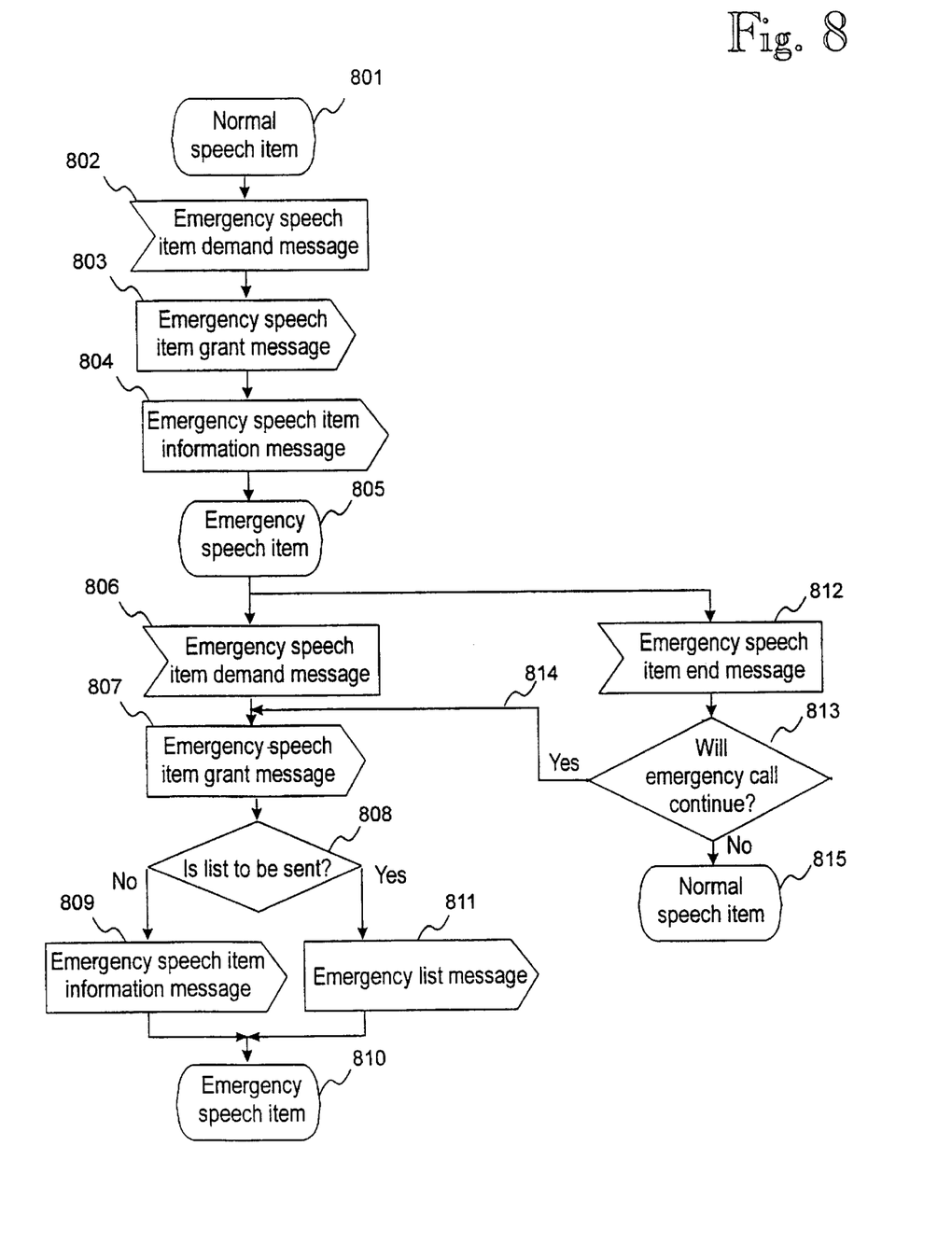
FIG. 8 is a flow chart illustrating the operation of the network infrastructure of the invention.

FIG. 8 is a flow chart illustrating the operation of the network infrastructure of the invention. In this flow chart, the arrowheads to the left of the blocks represent impulses supplied to the network infrastructure, whereas the arrowheads to the right of the blocks represent impulses supplied from the network infrastructure.

The method begins in a situation where a normal group call and one of its normal speech items is ongoing. An emergency speech item demand message arrives 802 at the network infrastructure from a subscriber station MS1 which is in an emergency and thus requests an emergency speech item. The network infrastructure grants an emergency speech item to this first subscriber station and sends 803 an emergency speech item grant message to it. At the same time, the network infrastructure, in accordance with the invention, sends 804 emergency speech item information containing the identifier of the first subscriber station to at least one other subscriber station to indicate that an emergency speech item has been allocated to the first subscriber station. Thereafter the first subscriber station begins its emergency speech item and uses 805 it.

During the emergency speech item, a third subscriber station MS3 may get into an emergency, whereby this subscriber station MS3 transmits an emergency speech item demand to the network infrastructure, which receives the message 806, and performs operations for granting the emergency speech item. After this, the method proceeds to step 807.

If the network infrastructure has received an end message 812 concerning the preceding emergency speech item before the new emergency speech item demand 806, it checks 813 whether the emergency call/emergency speech item continues. If not, the original, normal call continues 815 thereafter with normal speech items.

If it is found in step 813 that the emergency call continues 814 with a second emergency speech item, the method proceeds to step 807, to which it also proceeds directly from step 806. In step 807, the network infrastructure again sends an emergency speech item grant message to allocate an emergency speech item to the subscriber station that requested it. After this, according to this non-limiting embodiment, the network infrastructure examines whether a list is to be sent to the subscriber stations participating in the group call of the emergency speech item demands that are valid at that moment. This step can also occur earlier in the method, for example before step 804.

If it is found in step 808 that a list is to be sent, an emergency list message is sent in step 811 to the subscriber stations participating in the group call. If it is not necessary to send a list, an emergency speech item information message as described above is sent in step 809. After this, the emergency speech item 810 continues.

According to the preferred embodiment of the invention, when TETRA signalling is used, the highest value of the call priority element of the speech item demand message U-TX DEMAND is defined in addition to pre-emption to indicate that the talking party is in an emergency. Information on the emergency of the talking party is added to to the speech item grant message D-TX GRANTED to indicate the emergency. According to the TETRA standard, this can be done by assigning one value or one bit of the notification element of this message for this purpose. Another possibility is to define this information in the facility field formed by the supplementary service of talking party identification (SS-TPI) in the above-mentioned message.

The above-described first embodiment of the invention saves many bits in an emergency speech item information message, or a D-TX GRANTED message, since the use of the facility field requires that specific heading information be used. This applies particularly when a talking party's identifier is the subscriber number (ITSI=Individual Tetra Subscriber Identity). On the other hand, when a character sequence is used as the subscriber identifier, the facility field is required in any case, and addition of one or even two bits to it, particularly as an obligatory field, does not substantially increase the total length of the message.

An additional advantage of the embodiment described above is that the notification field is in use in almost every call control message sent to a mobile station; an emergency could thus also be indicated to mobile stations even by means of other call control messages. However, it would not be as easy to add the identifier of the subscriber in the emergency to the message as in the case of D-TX GRANTED. It would be necessary to use the facility field to indicate the identifier of the subscriber in the emergency.

A further aspect of the invention becomes apparent in a situation where more than one mobile stations (users of mobile stations) are in an emergency at the same or almost the same time. The embodiments described above as such support individual indication of the emergency of each talking party (one at a time). It is also possible that at least one other mobile station gets into an emergency at the same time that a mobile station in an emergency is transmitting. In such a case, according to the TETRA standard, it is known to transmit the speech item demand to the base station, but it is not self-evident that a speech item is to be allocated immediately to the new mobile station in an emergency. To allow the listening mobile stations to receive information on the new emergency, a specific emergency notification message is sent, according to the further aspect of the invention, to both the listening mobile stations and the mobile station of the currently talking party, who is in the emergency. The emergency notification message contains at least the identifier of the other mobile station in an emergency, and an emergency notification. The latter may also be encoded in the message only as the message type. According to the TETRA standard, the emergency notification message can be preferably sent by stealing a speech frame, particularly a less significant speech frame: the network infrastructure thus takes one or more speech frames of an emergency speech item for an emergency notification message and/or an emergency list.

To ensure indication of an emergency, and particularly of continuation of an emergency, the method and arrangement of the invention make it also possible to send a list of the mobile stations that are currently in an emergency when necessary or even with each speech item grant message. The base station may assume that the emergency in which an individual mobile station is continues until the mobile station requests a speech item without (the above-mentioned) pre-emptive priority indicating an emergency, or until the mobile station on ending its speech item indicates that the emergency has ended. When the operation of a base station or network infrastructure is defined, it is also possible to use other ways of indicating the end of an emergency, such as time supervision or emergency end notification sent by the dispatcher.

Although the invention has been described above with reference to mobile communication systems, it is also possible to apply it to other types of telecommunication networks.

The emergency indication described above can also be used with data transmission, particularly circuit switched data transmission. In the TETRA standard, the indication of an emergency in the case of circuit switched data transmission requires the additions described above.

The emergency notification field in a message from a mobile station in an emergency is preferably the call priority field, or speech item priority field, defined in the TETRA standard, whereby the message used is U-TX DEMAND.

Correspondingly, the emergency notification field in a message from the base station to the listening mobile stations is preferably the notification field of the D-TX GRANTED message defined in the TETRA standard, whereby a new value "talking party in emergency" is given to the field for this purpose.

The drawings and the specification relating thereto are intended merely to illustrate the inventive concept. In their details, the method, mobile communication system and mobile station of the invention may be modified within the scope of the appended claims.

It should be noted that other information to be sent with emergency information can, if necessary, also be sent in other messages and other speech items.

I claim:

1. A method for allocating emergency speech items in a mobile communication system comprising a network infrastructure, a first subscriber station connected to it and having an identifier, and at least one other subscriber station, said method comprising the following steps:

maintaining a group call consisting of speech items between the first subscriber station and at least one other subscriber station, transmitting an emergency speech item demand from the first subscriber station, which is in an emergency, to the network infrastructure, transmitting an emergency speech item grant message from the network infrastructure to the first subscriber station, transmitting, to said at least one other subscriber station, emergency speech item information containing the identifier of the first subscriber station and indicating that an emergency speech item has been allocated to the first subscriber station, in response to said emergency speech item information, informing the user of said at least one other subscriber station that said emergency speech item has been allocated to the first subscriber station.

2. A method according to claim 1, wherein said identifier of the first subscriber station is a subscriber number.

3. A method according to claim 1, wherein said identifier of the first subscriber station is a character sequence indicating the subscriber's name or position.

4. A method according to claim 1, wherein information on the quality of the emergency of the first subscriber station is transmitted with said emergency speech item information.

5. A method according to claim 1, wherein information on the location of the first subscriber station is transmitted with said emergency speech item information.

6. A method according to claim 1, wherein the emergency speech item information containing the identifier of the first subscriber station is transmitted in such a way that the network infrastructure steals one speech frame from the emergency speech item of the first subscriber station.

7. A method according to claim 1, wherein, in response to an emergency speech item demand sent by a third subscriber station, an emergency notification message is sent to the first subscriber station to indicate that the third subscriber station has requested an emergency speech item.

8. A method according to claim 7, wherein, in response to said emergency notification message, it is indicated to the user of the first subscriber station that a third subscriber station, which is in an emergency, has requested an emergency speech item.

9. A method according to claim 7, wherein, in response to said emergency notification message, the first subscriber station ends its emergency speech item.

10. A method according to claim 9, wherein said emergency speech item information is sent in a notification element of the emergency speech item grant message.

11. A method according to claim 9, wherein said emergency speech item information is sent in a facility field of the emergency speech item grant message, said field containing information on the subscriber.

12. A method according to claim 11, wherein said emergency speech item information is sent in a supplementary service element informing of a priority call in the facility field of the emergency speech item grant message.

13. A method according to claim 11, wherein said emergency speech item information is sent in a supplementary service element informing of a pre-emptive priority call in the facility field of the emergency speech item grant message.

14. A method according to claim 7, wherein said emergency notification message is also sent to said at least one other subscriber station, which is thus informed that the third subscriber station has requested an emergency speech item.

15. A method according to claim 7, wherein an emergency list containing the identifiers of the subscriber stations that are in an emergency at that moment is sent to said at least one other subscriber station.

16. A method according to claim 15, wherein said emergency notification message and said emergency list are sent in such a manner that the network infrastructure steals one or more speech frames from the emergency speech item of the first subscribe station.

17. A method according to claim 15, wherein said emergency list is sent to said at least one other subscriber station with said emergency speech item information.

18. A method according to claim 15, wherein said emergency list is also sent to the first subscriber station.

19. A method according to claim 1, wherein said network infrastructure assumes that the emergency of the first or the third subscriber station continues until the first or the third subscriber station requests a speech item without emergency notification.

20. A method according to claim 1, wherein said network infrastructure assumes that the emergency of the first or the third subscriber station continues until predetermined time supervision expires.

21. A method according to claim 1, wherein said network infrastructure assumes that the emergency of the first or the third subscriber station continues until the first or the third subscriber station sends a speech item end message informing that the first or the third subscriber station is no longer in an emergency.

22. A method according to claim 1, wherein said network infrastructure assumes that the emergency of the first or the third subscriber station continues until the dispatcher of the mobile communication system indicates that the emergency of the first or the third subscriber station has ended.

23. A method according to claim 1, wherein the emergency speech item information, which contains the identifier of the first subscriber station and which indicates that an emergency speech item has been allocated to the first subscriber station, is sent to said at least one other subscriber station from the network infrastructure in a message informing of the grant of the speech item.

24. A method according to claim 1, wherein said subscriber stations are line stations connected to the network infrastructure by radio link or wired connections.

25. A mobile communication system comprising:
   a network infrastructure, and
   a first and at least one other subscriber station, each having an identifier, which are connected to the network infrastructure and which are capable of communicating in a group call divided into speech items,
   the network infrastructure comprising
   means responsive to an emergency speech item demand sent by the first subscriber station for transmitting, to at least one other subscriber station, emergency speech item information containing the identifier of the first subscriber station and indicating that an emergency speech item has been allocated to the first subscriber station.

26. A mobile communication system according to claim 25, wherein the network infrastructure further comprises
   means responsive to an emergency speech item demand sent by a third subscriber station for transmitting an emergency notification message indicating that the third subscriber station has requested an emergency speech item to the subscriber stations participating in the group call.

27. A mobile communication system according to claim 26, wherein the network infrastructure further comprises
   means for transmitting an emergency list containing the identifiers of the subscriber stations that are in an emergency at that moment to subscriber stations.

28. A subscriber station of a mobile communication system, comprising
   a transceiver for participating in a call divided into speech items,
   a control unit for controlling the operation of the subscriber station,
   a user interface for indicating information to the user of the subscriber station,
   first indication means responsive to emergency speech item information which is received by the subscriber station and which indicates that an emergency speech item has been allocated to another subscriber station for indicating the situation in question to the user of said subscriber station.

29. A subscriber station of a mobile communication system, comprising
   a transceiver for participating in a call divided into speech items,
   a control unit for controlling the operation of the subscriber station,
   a user interface for indicating information to the user of the subscriber station,
   second indication means responsive to an emergency notification message which is received by the subscriber and which indicates that another subscriber station participating in the call has requested an emergency speech item for indicating, to the user of said subscriber station, that another subscriber station participating in the call has requested an emergency speech item.

30. A subscriber station according to claim 29, comprising
   force control means responsive to the emergency notification message received by the subscriber station for force controlling the subscriber station (MS1) to end its emergency speech item.

* * * * *